(12) United States Patent
Liu et al.

(10) Patent No.: US 7,796,554 B2
(45) Date of Patent: Sep. 14, 2010

(54) METHOD FOR RESOURCE MANAGEMENT AND METHOD FOR TRAFFIC GUIDANCE IN THE MULTIMODE RADIO NETWORK

(75) Inventors: Sheng Liu, Shenzhen (CN); Baijun Zhao, Shenzhen (CN)

(73) Assignee: UTStarcom Telecom Co., Ltd., Hangzhou, Zhejiang (CN)

( * ) Notice: Subject to any disclaimer, the term of this patent is extended or adjusted under 35 U.S.C. 154(b) by 607 days.

(21) Appl. No.: 11/547,061

(22) PCT Filed: Mar. 29, 2004

(86) PCT No.: PCT/CN2004/000278

§ 371 (c)(1), (2), (4) Date: Nov. 13, 2007

(87) PCT Pub. No.: WO2005/094100

PCT Pub. Date: Oct. 6, 2005

(65) Prior Publication Data

US 2008/0240036 A1    Oct. 2, 2008

(51) Int. Cl.
H04W 4/00    (2009.01)

(52) U.S. Cl. .............. 370/331; 370/332; 455/434; 455/552.1; 455/435.2; 455/453

(58) Field of Classification Search ............ 370/31, 370/332; 455/434, 552.1, 435.2, 453
See application file for complete search history.

(56) References Cited

U.S. PATENT DOCUMENTS

| | | | |
|---|---|---|---|
| 5,657,374 A | 8/1997 | Russell et al. | |
| 6,324,391 B1 | 11/2001 | Bodell | |
| 6,353,600 B1 | 3/2002 | Schwartz et al. | |
| 6,389,059 B1 | 5/2002 | Smith et al. | |
| 6,594,496 B2 | 7/2003 | Schwartz | |
| 2003/0148764 A1* | 8/2003 | Kelley | 455/434 |
| 2003/0171118 A1 | 9/2003 | Miya | |
| 2004/0121777 A1* | 6/2004 | Schwarz et al. | 455/452.1 |

FOREIGN PATENT DOCUMENTS

| | | |
|---|---|---|
| CN | 1464666 | 12/2003 |
| CN | 1471331 | 1/2004 |
| JP | 10-023497 A | 1/1998 |
| JP | 2001-506826 A | 5/2001 |
| JP | 2003-510920 A | 3/2003 |
| JP | 2003-520537 A | 7/2003 |

(Continued)

*Primary Examiner*—Barry W Taylor
(74) *Attorney, Agent, or Firm*—Ladas & Parry LLP

(57) ABSTRACT

The application discloses a method for resource management and a method for traffic guidance in a multimode radio network comprising a plurality of mobile communication networks of different modes that share wideband transmission links and sites of centralized base stations, the centralized base stations of the plurality of mobile communication networks being connected to a common base station controller or a common radio networks controller. A mobile terminal is made to perform real-time handover among different mobile communication networks, or, the allocation of the resources among the plurality of mobile communication networks is adjusted in real time, according to at least one of the following factors or the combination thereof: the multimode supporting capability of the mobile terminal, traffics of cells, operation policies and real-time operating conditions of the plurality of networks.

3 Claims, 4 Drawing Sheets

FOREIGN PATENT DOCUMENTS

| WO | WO90/05432 | 5/1990 |
| WO | WO98/27748 A2 | 6/1998 |
| WO | WO01/22764 A1 | 3/2001 |
| WO | WO01/5442 A1 | 7/2001 |
| WO | WO01/72015 | 9/2001 |
| WO | WO02/056626 | 7/2002 |

* cited by examiner

METHOD FOR RESOURCE MANAGEMENT AND METHOD FOR TRAFFIC GUIDANCE IN THE MULTIMODE RADIO NETWORK

TECHNICAL FIELD

The present invention relates to the field of distributed base stations in a mobile communication system, in particular to a method for dispatching resources when employing radio access networks of multiple modes in a centralized base station architecture with remote radio units, and a method for allocating traffics among the radio access networks.

BACKGROUND ART

In a mobile communication system, a base station BTS transmits, receives and processes wireless signals, as shown in FIG. 1(a). A conventional base station comprises a baseband processing sub-system 1, a radio frequency (RF) sub-system 2 and an antenna 3. A BTS may cover a plurality of cells 4 with a plurality of antennae. Each of the base stations (BTSs) is connected to a base station controller (BSC) or a radio network controller (RNC) via respective interfaces. Thus, a radio access network (RAN) is formed, as shown in FIG. 1(b).

FIG. 2 illustrates an architecture of another distributed base station, that is, a centralized base station with remote radio units. As compared with a conventional base station, such a centralized base station with remote radio units has multiple advantages: it is possible to replace a macro-cell based on a conventional base station with a plurality of micro-cells, so that the station would be more adaptable to various radio environments and the wireless performances such as the capacity and coverage of the system could be improved; the centralized architecture makes it possible to perform softer handover than the soft handover in a conventional base station, thereby obtaining additional processing gain; the centralized architecture also makes expensive processing resources for the baseband signals to be a common resource pool shared by a plurality of cells, thereby benefiting from statistically multiplexing and reduces the cost of the system. Details of such a technology are disclosed by PCT Patent Application WO9005432, entitled "Communication System"; U.S. Pat. No. 5,657,374, entitled "Cellular System with Centralized Base Station and Distributed Antenna Units" and U.S. Pat. No. 6,324,391, entitled "Cellular Communication with Centralized Control and Signal Processing"; Chinese Patent Applications CN1464666, entitled "Software Defined Radio Base Station System With Optical Fiber Linked Remote Radio Units and Synchronous Method Thereof" and CN1471331, entitled "Base Station System for Mobile Communication"; and U.S. Patent Application US 20030171118, entitled "Cellular Radio Transmission Apparatus and Cellular Radio Transmission Method".

As shown in FIG. 2, a centralized base station with remote radio units comprises a central channel processing sub-system 6 that is centrally arranged and remote radio units 7 connected to the sub-system 6 through wideband transmission links 8 or networks. The central channel processing sub-system comprises a channel processing resource pool 9, a signal routing and allocating unit 10 and the like. Here, the channel processing resource pool 9 comprises multiple stacked channel processing units 11, carries out baseband signals processing and the like. The signal routing and allocating unit 10 dynamically allocates the channel processing resources based on the different traffics in the cells to realize effective share of the processing resources among the cells. The signal routing and allocating unit 10 may be either implemented as a separate device outside the central channel processing sub-system 6, or implemented inside the central channel processing sub-system 6, as shown in FIG. 2. A remote radio unit 7 comprises a RF power amplifier for transmission channel (not shown), a low-noise amplifier for receiving channel (not shown), an antenna 12 and other functional units. The links 8 between the central channel processing sub-system 6 and the remote radio units 7 are typically realized with a transmission medium such as optical fiber, copper cable and microwave, where the signal transmission mode may be sampled digital signal or modulated analog signal, and the signal may be baseband signal, intermediate-frequency signal or radio frequency signal. Methods for dynamically allocating channel processing resources based on the different traffics of cells are disclosed in the U.S. Pat. No. 6,353,600, entitled "Dynamic Sectorization in CDMA Employing Centralized Base-station Architecture" and the U.S. Pat. No. 6,594,496, entitled "Adaptive Capacity Management in a Centralized Base Station Architecture."

In a centralized base station with remote radio units, the wideband transmission links 8 between the central channel processing sub-system 6 and the remote radio units 7 and the antenna 12 are not directly influenced by the radio properties of the radio access networks. Thus, when mobile communication systems of various modes are deployed in one region, the wideband transmission links 8, the station site and BSC or RNC or the like can be shared, thereby significantly shortening the period and reducing the costs for establishing the systems.

However, in the situation that a plurality of mobile communication systems or multiple mobile communication systems of different modes share the wideband transmission links and BSC or RNC, there obviously will appear the problems of conflicts of resource requirements and utilization efficiency of the resources.

SUMMARY OF THE INVENTION

To solve the above problems, an object of the invention is to propose a method for resource management and a method for traffic guidance in a multimode radio network.

According to one aspect of the invention, the multimode radio network comprises a plurality of mobile communication networks of different modes that share wideband transmission links and sites of centralized base stations, wherein the centralized base stations of the plurality of mobile communication networks are connected to a common base station controller or a common radio networks controller. A method for resource management in the multimode radio network is characterized by making a mobile terminal to perform real-time handover among different mobile communication networks, or adjusting in real time the allocation of the resources among the plurality of mobile communication networks, according to at least one of the following factors or the combination thereof: the multimode supporting capability of the mobile terminal, traffics of cells, operation policies and real-time operating conditions of the plurality of networks.

According to another aspect of the invention, a method for guiding traffics in the multimode radio network comprises the following steps: when a mobile terminal accesses one of said plurality of mobile communication networks, the mobile terminal reports its multimode supporting capability to the base station controller or the radio networks controller while the base station that is accessed by the mobile terminal reports its current occupancy of resources to the base station controller or the radio networks controller. If the mobile terminal supports multiple modes, the base station controller or the radio networks controller determines whether it is necessary to guide the mobile terminal into another mobile communication network according to the operation policies set by the system. If necessary, it sends an instruction to the mobile terminal. According to the instruction, the mobile terminal exits from the current network and re-accesses a mobile communication networks specified by the instruction.

BRIEF DESCRIPTION OF THE DRAWINGS

The preferred embodiments of the invention are illustrated in connection with the exemplary accompanying drawing, in which.

DETAILED DESCRIPTION OF THE PREFERRED EMBODIMENTS

Architecture of the System

Figure 1B:
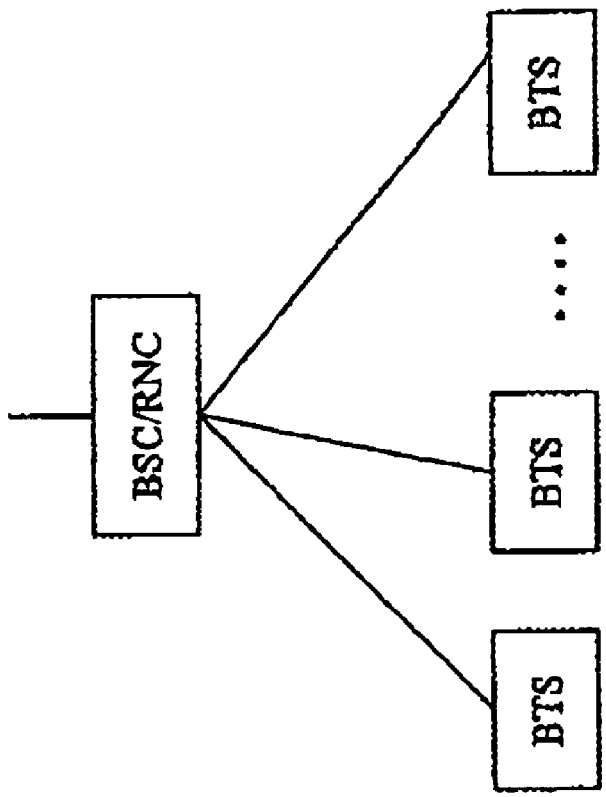
FIG. 1(b) is a schematic diagram showing a conventional radio access network.
Figure 1A:
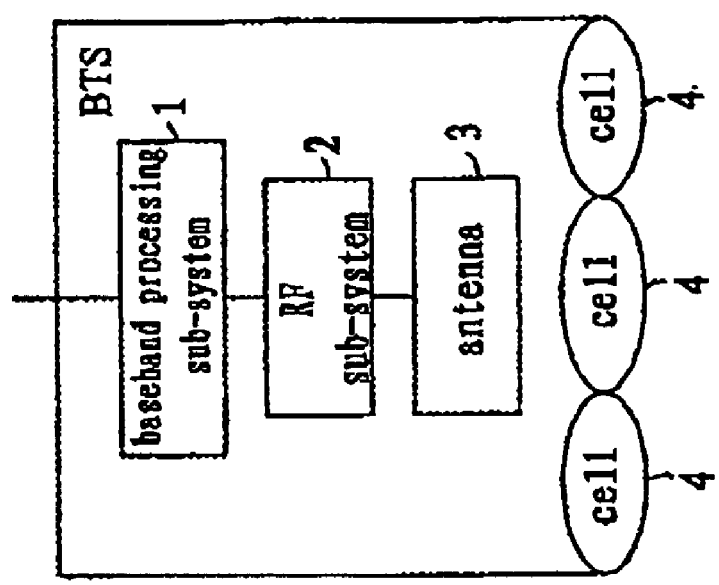
FIG. 1(a) is a schematic diagram showing a conventional base station.
Figure 2:
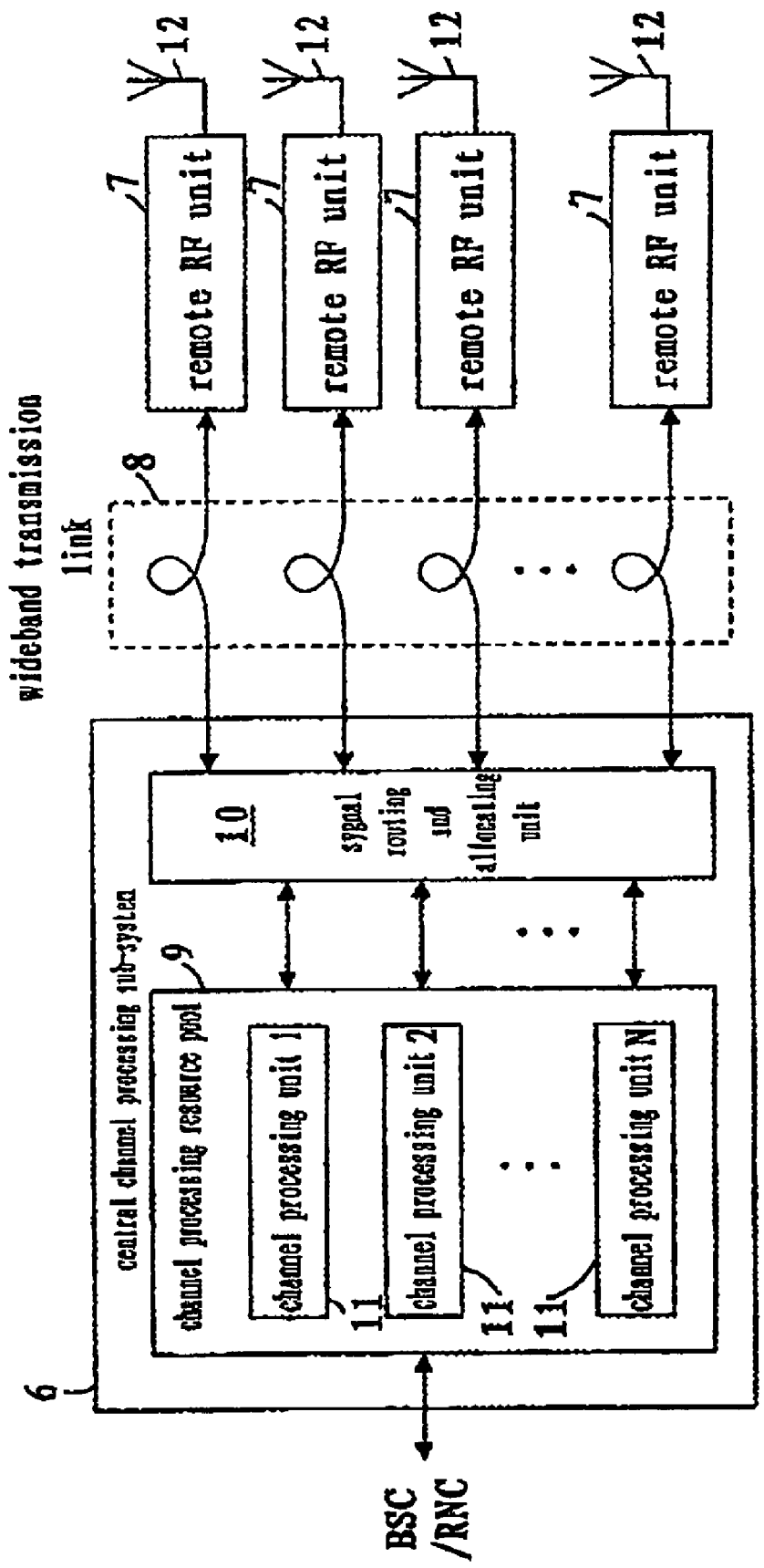
FIG. 2 is a structural diagram showing a centralized base station with remote radio units.
Figure 3:
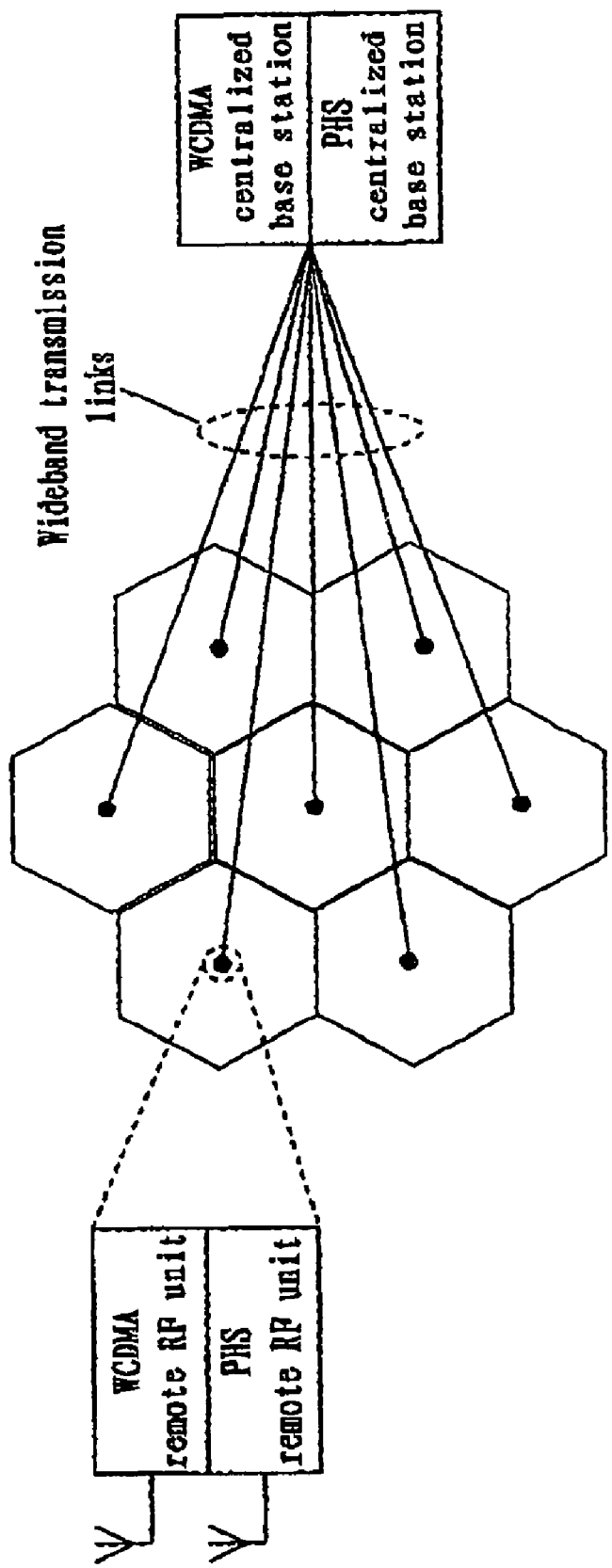
FIG. 3 is a schematic diagram showing radio networks with different modes that share the base station when employing a centralized base station architecture with remote radio units.

FIG. 3 illustrates base station sharing between radio networks of different modes when employing a centralized base station with remote radio units, which is especially applicable to the applications relating to micro-cells and pico-cells. For convenience of explanation, in FIG. 3, WCDMA (wideband code division multiple access) and PHS (personal handset system) systems are taken as an example. However, the invention is not limited to the mobile communication systems of these two modes, and may be extended to the other systems such as CDMA2000, GSM/GPRS, UTRA TDD and the like. The methods and principles of the invention are also applicable to the mobile communication systems with other modes. Also, the invention is applicable to any mobile communication system with more than two modes.

The WCDMA and PHS systems as shown in FIG. 3 share the same wideband transmission links, station sites and some other facilities, but they respectively have their own centralized base stations and remote radio units due to different modes of the radio interfaces and the like. In order to avoid the potential interference between the systems, they generally use their own antennae respectively and take suitable measures, for example, keeping reasonable spaces between the antennae, mounting the antennae at different heights, setting a protective filter at a RF front-end, and the like.

The typical situation where an operator builds a plurality of mobile communication systems of different modes in the same region in a manner as shown in FIG. 3 is a situation where one or more mobile communication systems have been under well operation in the region, such as the widely used GSM and PHS networks. Due to a long-term operation, the systems perform well in terms of system capacity and coverage. At this time, in order for transition to a new generation of mobile communication networks, such as the third generation mobile communication networks WCDMA, CDMA2000, UTRA TDD or the like, the operator may set up new mobile communication networks by sharing the facilities like the wideband transmission links and the station sites in a manner as shown in FIG. 3 if the existing system employs a centralized base station with remote radio units, thereby significantly shortening the period of constructing a system and reducing the cost.

Limited by the cost of the system, a newly established mobile communication network usually cannot reach a full coverage and maximum system capacity at the beginning. However, if an operator has adopted a centralized base station with remote radio units in the existing system, he need not invest for wideband transmission links and station sites any more. In addition, remote radio units and antennae are substantially independent of system capacity but mainly depend on the requirement for radio coverage, while the first concern of an operator for establishing a new mobile communication network is to ensure enough radio coverage rather than system capacity. Therefore, the operator may set up distal radio units and antennae for a new generation of mobile communication networks with one-time investment at the beginning of the establishment, and then, according to the budget and the early target capacity, set up the other parts, including the centralized base station, the base station controller (or the radio networks controller), core networks and transmission networks.

When a new generation of mobile communication networks is set up as described above, the key is to reasonably allocate the processing resources of the centralized base station (hereinafter referred to as "system resources") because the system equipments such as the centralized base station are configured according to limited system capacity, while the processing resources of the centralized base station are commensurate with the system configuration for the base station controller (or the radio networks controller), the core networks and the transmission networks. The invention will be described in details below by taking a dual-mode (WCDMA/PHS) system as an example wherein the WCDMA will be set up on the basis of the existing PHS network. Since the WCDMA network has a relatively small capacity at the beginning while the PHS network has a well-done capacity and coverage, a critical point is the allocation of the system resources in WCDMA.

(Resources Management Method)

A centralized base station architecture with remote radio units makes it possible to dynamically allocate the resources among a plurality of cells. In particular, due to employment of the centralized base station architecture with remote radio units, when the method for dispatching system resources according to the invention is to increase system resources occupied by a cell, the processing resources as required may be obtained from the resources pool of the centralized base station; on the other hand, when the method for dispatching system resources according to the invention is to reduce system resources occupied by a cell, the saved system resources may be placed into the resources pool of the centralized base station to be re-dispatched to the other cells. Therefore, according to the invention, WCDMA/PHS system resources may be flexibly dispatched based on, but not limited to, one of the following factors or the combination thereof:

1. dispatching the WCDMA/PHS system resources according to the multimode supporting capability of the user equipment (UE) held by the user accessing the cell, i.e., by distinguishing whether the UE supports single mode, that is WCDMA, or dual modes, that is, WCDMA/PHS mode;

2. dispatching the WCDMA/PHS system resources according to the traffic or load of the cell;

3. dispatching the WCDMA/PHS system resources according to the operator's policies, such as the distribution of the traffics between the WCDMA and PHS networks, fee policies, levels (or priorities) of users or the like;

4. dispatching the WCDMA/PHS system resources according to the real-time operating conditions of the WCDMA and PHS networks, such as whether there happens failures or whether there is any device being upgraded.

It is preferable to flexibly dispatch the WCDMA/PHS system resources for the WCDMA/PHS dual-mode centralized base station system with remote radio units and common wideband transmission links and station sites, according to the above factors and the following rules.

In a preferred embodiment according to the invention, if a user uses a mobile terminal that supports WCDMA/PHS dual-mode, then when there are not sufficient system resources in the WCDMA cell where the mobile terminal stays, the user can be switched to the PHS network so as to save the processing resources of the WCDMA system and ensure the service for the user will not be interrupted. Available resources of a system determine the traffic that could be supported by the system, and depends on such factors as the hardware resources of the system and the operating condition of the networks. The operating condition of the networks includes whether there happens any failure or whether there is any device being upgraded. For example, when a system fails or any device thereof is being upgraded, its processing capability will temporarily decrease. If the current traffic is close to the maximum traffic that the system could support, in other words, the difference between them becomes lower than a threshold, the system resources will be deemed insufficient, and the above switch will be performed.

In another preferred embodiment according to the invention, if the traffic or load caused by single-mode mobile terminals supporting WCDMA in a WCDMA cell is large, then relatively more WCDMA system resources may be dispatched to the cell. Since the single-mode mobile terminal supporting WCDMA cannot access the PHS network, relatively more system resources should be dispatched to the cell so as to guarantee the singe-mode mobile terminal supporting WCDMA to be served. Thus, when the traffic caused by single-mode mobile terminals supporting WCDMA in a cell is higher than a threshold, the system resources occupied by the cell are increased.

In yet another preferred embodiment according to the invention, the operator may dispatch the WCDMA/PHS system resources according to the operation policies, which include at least one of the following items or combination thereof: allocation scheme of the traffic among different mobile communication networks, fee policy and levels of users. These policies are determined by the operator in consideration of maximization of operation revenues, policy of transition between WCDMA and PHS networks, distribution of target users between WCDMA and PHS networks and the like. For instance, if the system resources permit, the operator desires to maximize the operation revenues. Maximization of revenues in a specific condition of system resources means a specific distribution of traffics in respective networks. It is a matter of optimization well-known for those skilled in the art and the description thereof is omitted. Additional factors may be taken into account while determining the distribution of traffics between two networks. For example, in the incipient stage of establishing the WCDMA network on the basis of the PHS network, it might be necessary to encourage the users to use the WCDMA network. Then, some preferential prices might be taken for the WCDMA network, and mobile terminals supporting dual-mode are preferentially switched to access the WCDMA network as long as the resources permit. For another instance, levels of users may be determined from the characteristics of the target users and their distribution between the two networks; alternatively, levels of users may be determined from the quality of service that is committed in the service contract, or be directly contracted. Thus, users with different levels may utilize the corresponding networks preferentially.

It is to be noted that although the above embodiment has been described by taking the PHS network and the WCDMA network as examples, the invention can be applicable to the other mobile communication networks, and the number of the co-existing networks is not limited to two, but may be more.

The operation policies may be implemented in various manners. Except by changing the system resources available to a cell in respective networks, the operation policies may also be implemented by statically configuring or dynamically changing said thresholds. In addition, when there are more than two mobile communication networks, a preferential order of switch among the networks may be determined.

It is apparent that the above embodiments may be combined at will to obtain new embodiments, as indicated above.

(Traffic Guidance Method)

According to another aspect of the invention, in order to achieve the dispatching of WCDMA/PHS system resources as required by the above rules, the traffic may be guided by adopting a policy of network-directed handover between systems. The traffic guidance method according to the invention will be described by taking a handover from WCDMA to PHS as an example.

Figure 4:
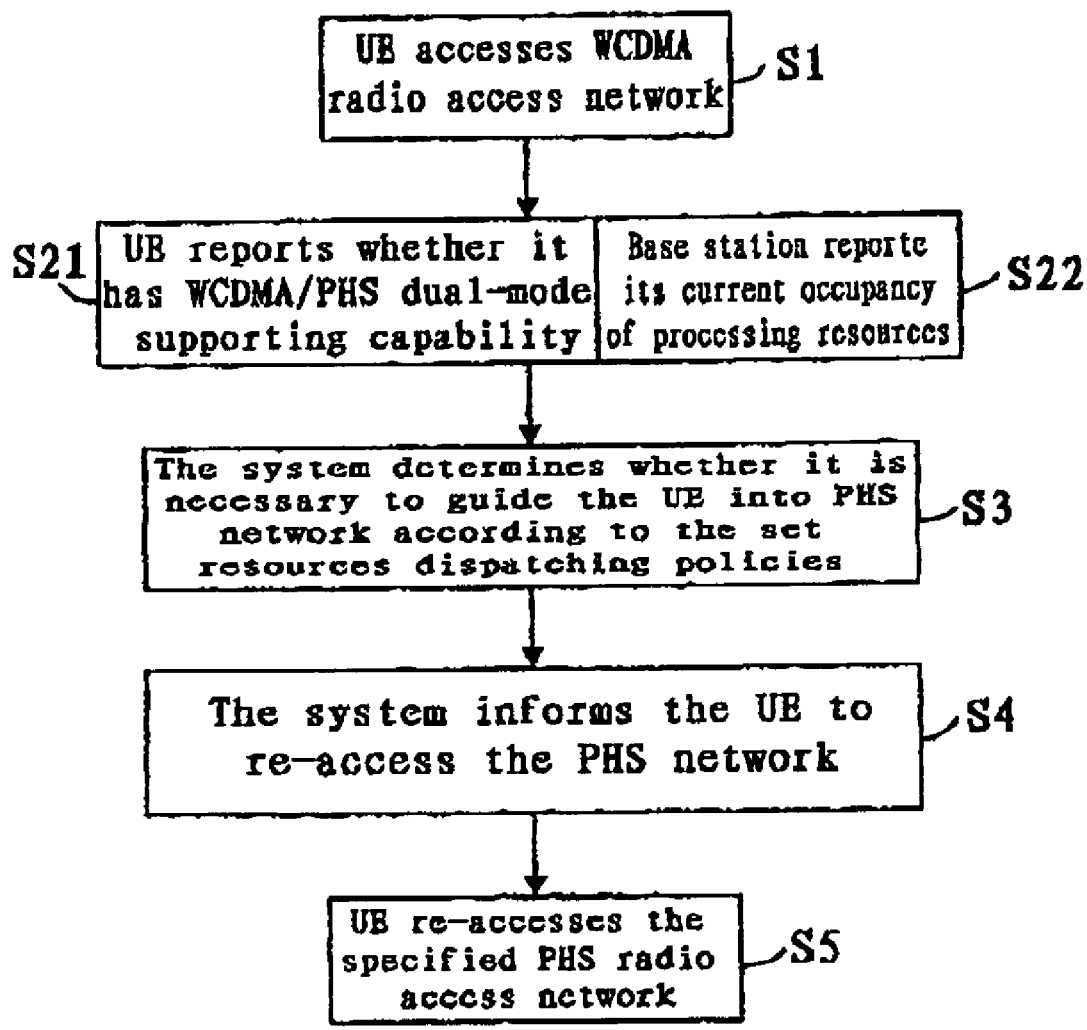
FIG. 4 is a flowchart showing the method for traffic guidance according to the invention.

As shown in FIG. 4, when a UE accesses a radio access network (step S1), i.e., when a RRC (radio resource control) link is established, the RNC will request the UE to report its multimode supporting capability (step S21). At the same time, the base stations also report the current occupancy of the processing resources to the RNC (step S22). Then, according to the operation policies set by the system, the RNC may determine whether it is necessary to guide the UE into the PHS network (step S3). If so, the RNC will instruct the UE to re-access the specified PHS network (step S4). In response to this instruction, the UE exits from the WCDMA by disconnecting the already established RRC link, and re-accesses the specified PHS network (step S5). In addition, in the instructing step, the information required when accessing the PHS network, such as the system parameters of the PHS network, may be transmitted to the UE so as to shorten the time it takes to access the PHS system.

The other aspects are similar to those in "Resources Management Method" as discussed above and the descriptions thereof are omitted.

Of course, the guidance may be performed when the mobile terminal accesses the PHS network so that the mobile terminal with dual-mode capability may be guided to access the WCDMA network in a suitable condition.

Similarly, in the embodiment, the number of mobile communication networks is not limited to two, and of course, the mobile communication networks are not limited to the WCDMA network and the PHS network.

The description above shall not be deemed as a limitation to the protection scope of the invention. Instead, all the variations and equivalents without departing from the substance of the invention are to be included in the spirit and scope of the invention.

The invention claimed is:

1. A method for resource management in a multimode radio network comprising a plurality of mobile communication networks of different modes that share wideband transmission links and sites of centralized base stations, the centralized base stations of the plurality of mobile communication networks being connected to a common base station controller or a common radio networks controller, the method comprising the steps of:

when a mobile terminal supports mobile communication networks of more than two modes, if the difference between the actual traffic and the traffic that can be supported by the network operating conditions and the system resources occupied by the cell of one mobile communication network where the mobile terminal stays is lower than a first threshold, the mobile terminal is switched to another mobile communication network; and when the traffic of a cell caused by single-mode mobile terminals is higher than a second threshold, system resources occupied by the cell are increased.

2. The method according to claim 1, wherein the system resources that are available to respective cells in the networks are changed according to predetermined operation policies, or any of said first and second thresholds and a preferential order of handover between the networks are statically configured or dynamically changed.

3. The method according to claim 2, wherein said predetermined operation policies include at least one of the following items or combination thereof:

distribution of traffics among the plurality of mobile communication networks, policy of fees and levels of users.

* * * * *